Patented Sept. 12, 1933

1,926,540

UNITED STATES PATENT OFFICE 1,926,540

CATALYTIC OXIDATION OF CRUDE ANTHRACENE

Alphons O. Jaeger, Mount Lebanon, Pa., assignor, by mesne assignments, to The Selden Research & Engineering Corporation, Pittsburgh, Pa., a corporation of Delaware No Drawing. Application March 28, 1931
Serial No. 526,134

8 Claims. (Cl. 260—57)

This invention relates to the production of anthraquinone by the catalytic oxidation of crude anthracene.

In my prior application Serial No. 228,977, which is now Patent No. 1,846,728, issued December 26, 1930, filed Oct. 26, 1927 processes for purification of crude aromatic compounds, including crude anthracene have been described, in which the anthracene is purified by selective catalytic oxidation of impurities, the process being carried out in the presence of catalysts which favor oxidation of the impurities, but which do not favor the oxidation of anthracene to anthraquinone. In my co-pending application Serial No. 264,571, filed March 24, 1928, which is a division of Patent No. 1,709,853 dated April 23, 1929, processes for the production of anthraquinone are described in which similar stabilized combustion catalysts which favor the oxidation of impurities but not the oxidation of anthracene are used in conjunction with anthraquinone catalysts. This application, of which the present case is a continuation in part, discloses only the production of anthraquinone from semi-purified anthracene, the semi-purified product being in some cases produced by the catalytic purification of crude material.

In my application Serial No. 301,693 which is now Patent No. 1,880,322, issued October 4, 1932 filed August 23, 1928, the use of alkaline catalysts for the production of anthraquinone is proposed, one function of the alkali being to decompose carbazol, but this application also discloses only the production of anthraquinone from semi-purified anthracene.

The present invention is based on the surprising discovery that crude anthracene as sold on the market, and containing all the phenanthrene, carbazole, dead oils, chrysene, retene, methyl anthracene, diphenyl, pyrene, acridine and other impurities, ranging in amounts from more than one to 5 times the weight of the anthracene present, can be directly oxidized to anthraquinone of commercially usable purity without any preliminary purification whatsoever, by the employment of suitable catalysts and reaction conditions. This discovery is the more unexpected as the opinion has been maintained for years that anthracene of such a low grade of purity could not be oxidized directly, and extensive research has been devoted entirely to the problem of developing suitable solvent and catalytic purification methods for removal of the undesired constituents. I have found however that by the use of suitable composite catalysts, containing combustion components for the undesired impurities and oxidation components for the production of anthraquinone from the anthracene, a product can be obtained which can be directly used for many of the purposes for which anthraquinone from other sources is now employed, and particularly for the production of alizarin.

The preferred catalysts for the production of anthraquinone from crude anthracenes contain stabilizers to limit the total oxidation of anthracene to carbon dioxide and water, and I have found that by the use of proper amounts of these substances, with or without the addition of suitable stabilizer promoters, the activity of the oxidation and combustion catalysts present can be damped to such an extent that the activity is well below that at which serious amounts of combustion of the anthracene takes place, although its activity is sufficient to oxidize the less stable impurities present in the crude material. Carbazol, being a heterocyclic compound, is more readily decomposed than are the stable aromatic nuclei, while phenanthrene, by reason of its asymmetrical constitution, resembles more nearly the aliphatic compounds in its stability towards oxidation and is much more readily decomposed than anthracene. These two substances are the chief impurities present in crude anthracene and are by far the most stable, and no difficulty is encountered in oxidizing the other impurities present when catalysts are employed which will oxidize these two compounds.

The catalytically active elements which may be used for oxidizing the anthracene to anthraquinone in the composite catalysts employed in the present process may be metals of the 5th, 6th and some members of the 8th groups of the periodic system, together with stabilizer promoters selected from the metals of the 3rd to the 8th groups of the periodic system inclusive. The term "stabilizer promoter" is intended to cover substances which are catalytically active, but which do not possess specific catalytic activity for the oxidation of anthracene to anthraquinone under the conditions used in the reaction, and which substances promote the reaction by extending the action of the stabilizer. Iron and copper are particularly useful stabilizer promoters for this purpose, and may be used in conjunction with any of the stabilizers, which are, as is well known, compounds of the alkali forming metals, i. e. alkali and alakaline earth metals.

Reference has been made to combustion catalysts and oxidation catalysts for anthracene, as if these were separate constituents of the contact mass, but it is to be noted that in many cases the same catalyst which promotes the oxidation of anthracene to anthraquinone will serve as a combustion catalyst for the impurities, and vice versa. This combined action is probably due to the greater stability of anthracene over the impurities present, as has already been pointed out, and I am also of the opinion that the presence of more readily oxidizable impurities, which appear to take up the more active oxygen of the catalyst and prevent too drastic an oxidation of the more difficulty oxidizable anthracene to carbon dioxide and water, has a certain beneficial influence on the amount of total combustion of the anthracene. The comparatively small amount of total combustion of this substance may also be due in part to the blanketing action of large amounts of substances other than anthracene and oxygene in the reaction gas mixture, but irrespective of any theory as to the mechanism of the reaction, the fact remains that commercitlly useful anthraquinone can be obtained in good yields from crude anthracene of as low as 15-20% anthracene content, by the action of catalysts sufficiently powerful to oxidize the tremendous amount of impurities present, without serious amounts of total combustion of the anthracene itself. The invention is not limited, however, to the use of catalysts which have a combined action on the anthracene and impurities, but on the contrary substances such as cerium oxide, titanium oxide, aluminum, thorium oxide, copper oxide, nickel oxide, cobalt oxide, and the like, which have little if any catalytic power in the oxidation of anthracene to anthraquinone, can be used as combustion catalysts in conjunction with catalysts for the partial oxidation of anthracene. Such catalysts are preferably stabilized, and when large amounts of carbazol are present the use of alkaline stabilizers aids in the decomposition of this substance as well as in the production of anthraquinone from the anthracene.

Since in many cases considerable amounts of material must be oxidized in order to obtain commercial amounts of anthraquinone, and since a number of strongly exothermic reactions are progressing simultaneously, it is necessary to use powerful temperature regulating means to control the course of the anthraquinone reaction. Converters of the bath type in which catalyst tubes are in heat exchanging relation with a circulating, non-boiling bath or with a bath which boils at or below the temperature of the reaction should be used, and it is also sometimes advantageous to vary the catalyst strength in the direction of flow of the gases, in order to more completely control the course of the reaction.

The bath temperatures to be used in carrying out the combined oxidation of anthracene and combustion of the impurities should, as a general rule, be somewhat lower than those used in the corresponding oxidation of pure or semi-purified anthracene, for the excessive heat evolution resulting from the tremendous amount of total combustion makes it necessary to use as high a heat head as possible between the bath and the catalyst. In general, bath temperatures higher than 550° C. should not be used, and with most catalysts it is preferable to use bath temperatures of 280-460° C., depending upon the amount of impurities in the crude material, the type of catalyst used, and other factors of the reaction. Since crude anthracene sold on the market may vary considerably in relative content of anthracene and impurities and since, for this reason, a wide range of bath temperatures must be provided for, it is desirable to provide means for varying the bath temperature of the converter. This may be done either by employing boiling alloys such as mercury-lead, mercury-cadmium, mercury-tin and the like, which may be changed in composition by distilling off fractions of the condensate, or by using varying pressure on the boiling bath. Similarly, changes in the rate of recirculation of a non-boiling bath may be used, or alteration of the extent and temperature of its controlling surfaces.

The present invention is not limited to any spesific method of treating the anthraquinone vapors leaving the converter, although preferred methods of treatment will be described in the following examples. In general, the most efficient method of separating the anthraquinone from such large amounts of gaseous reaction products is the use of fractional condensation in condensers having positive temperature control. Rapid cooling of the gases leaving the converter, followed by sublimation or distillation of the anthraquinone may also be used, as well as solvent methods such as those using furfural or other heterocyclic solvents described in my prior application Serial No. 296,869, filed August 1, 1928.

The invention will be described in greater detail in the following examples, which are for illustrative purposes only and to which it is not limited.

*Example 1*

A catalyst is prepared as follows:
18.2 parts of $V_2O_5$ are dissolved in a solution containing 22.6 parts by weight of 100% KOH together with 240 parts of water. The potassium vanadate solution so formed is stirred into a solution containing 5.6 parts $MnSO_4.2H_2O$ and 22.65 parts $Fe_2(SO_4)_3$ in 300 parts water. The precipitate so formed is filtered with suction, washed, and sludged up with 33 parts by weight of concentrated sulfuric acid dissolved in 200 parts of water, and the suspension sprayed onto 1250 parts by weight of pumice of 6-10 mesh particle size.

A crude anthracene of 40-45% anthracene content, obtained from the distillation of tar from an American coal and containing appreciable quantities of phenols, naphthalene, and other substances which would interfere with a solvent purification, as well as 17-22% carbazol and 31-38% phenanthrene is vaporized with air at 200-260° C. in a ratio of 1 part crude anthracene to 30-50 parts by weight of air, and passed over the contact mass. The mass is retained in a tubular converter, the catalyst tubes being surrounded by a non-boiling bath consisting of a eutectic mixture of sodium nitrate and sodium nitrite, and the bath is maintained at temperatures of 380-440° C. by suitable temperature regulation. The effluent gases from the converter are led into a series of condensers, the first being steam jacketed with steam under 120 pounds, the second with steam at about 100 pounds, the third at about 80 pounds and the fourth being a box condenser designed to permit separation of the remaining solid material. An anthraquinone of 92-96% purity is recovered from the first condenser, which is directly usable without further purification for sulfonation to silver salt, as described in the co-pending application of Jaeger and West, Serial No. 526,135, filed March 28, 1931. In the second condenser a product is obtained of 83-91% purity, from which a commercially usable product can be obtained by sublimation with steam or with steam and air. The third condenser contains a product of 30–50% anthraquinone and the fourth a 15% product, together with tailings and impurities such as phthalic anhydride, maleic acid, and the like.

Instead of using a mixture of iron and manganese compounds in the above described catalyst, equivalent proportions of iron and copper may be used. Cobalt, tin or cadmium may also be substituted for the manganese, if desired.

*Example 2*

Potassium vanadate, prepared by dissolving 10 parts by weight of $V_2O_5$ in a solution containing 7 parts of 100% KOH and 150 parts of water, is reacted with ferric chloride prepared by dissolving 5.84 parts $Fe_2O_3$ in 11 parts concentrated hydrochloric acid diluted with 50 parts water. The precipitate is filtered and washed and suspended in 250 parts of water so that a fine suspension is obtained, which is sprayed onto 500 parts pea-sized pumice stone. The catalyst so obtained is calcined with air at 450° C. and then with dilute $SO_2$ gases, after which it is again blown out with air.

A crude anthracene of 30–40% purity is vaporized by spraying into a current of air at 240–280° C. and passed over the catalyst, which is retained in a tubular converter similar to that described in Example 1 and having a bath temperature 340–400° C. The vapors from the converter are led to a fractional condenser similar to that in the preceding example, and an anthraquinone of 90–95% purity is obtained in the first chamber. A product of 83–90% is obtained in the second chamber, and a product of 30–45% anthraquinone on the dry basis with 1.6–3.1 moisture content is obtained in the third condenser. The tailings from this process as collected in a box condenser contain 15% anthraquinone on the dry basis together with 40% moisture.

The above described catalyst may be stabilized by incorporating alkali or alkaline earth metal compounds with the ferric vanadate suspension before spraying, or an alkaline stabilizer such as potassium or calcium hydroxide may be used if the amount of carbazol in the crude material is unduly large.

What is claimed as new is:

1. A process of producing anthraquinone which comprises passing vapors of crude anthracene in admixture with an oxidizing gas at reaction temperatures over a contact mass containing a catalyst for the vapor phase oxidation of organic compounds and also containing at least one compound of a metal included within the group consisting of alkali metals, alkaline earth metals.

2. A process of producing anthraquinone which comprises passing vapors of crude anthracene, in admixture with an oxidizing gas, at reaction temperatures, over a contact mass containing components favoring the oxidation of anthracene to anthraquinone and components favoring the combustion of impurities and also containing at least one compound of a metal included within the group consisting of alkali metals, alkaline earth metals.

3. A process of producing anthraquinone which comprises passing vapors of crude anthracene, in admixture with an oxidizing gas, at reaction temperatures, over a contact mass containing components favoring the oxidation of anthracene to anthraquinone and components favoring the combustion of impurities and also containing at least one compound of a metal included within the group consisting of alkali metals, alkaline earth metals, and at least one substance which is catalytically active but it not a specific catalyst for the oxidation of anthracene to anthraquinone and extends the action of the alkali metal compound.

4. A process according to claim 1, in which the reaction mixture contains more than five parts by weight of oxygen to one part by weight of crude anthracene vapors.

5. A process according to claim 2, in which the reaction mixture contains more than five parts by weight of oxygen to one part by weight of crude anthracene vapors.

6. A process according to claim 1, in which the catalyst contains a compound of vanadium.

7. A process according to claim 2, in which the catalyst contains a compound of vanadium.

8. A process according to claim 2, in which the catalyst contains vanadium in chemical combination and also iron in chemical combination.

ALPHONS O. JAEGER.